United States Patent
Obrecht et al.

(10) Patent No.: US 9,670,901 B2
(45) Date of Patent: Jun. 6, 2017

(54) TRAILING EDGE MODIFICATIONS FOR WIND TURBINE AIRFOIL

(71) Applicant: Siemens Aktiengesellschaft, München (DE)

(72) Inventors: John M. Obrecht, Louisville, CO (US); Arni T. Steingrimsson, Erie, CO (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 443 days.

(21) Appl. No.: 14/221,726

(22) Filed: Mar. 21, 2014

(65) Prior Publication Data
US 2015/0267678 A1 Sep. 24, 2015

(51) Int. Cl.
*F03D 1/06* (2006.01)

(52) U.S. Cl.
CPC ......... *F03D 1/0633* (2013.01); *F03D 1/0675* (2013.01); *F05B 2250/183* (2013.01); *F05B 2260/96* (2013.01); *Y02E 10/721* (2013.01)

(58) Field of Classification Search
USPC .................. 416/228, 236 A, 236 R
See application file for complete search history.

(56) References Cited

U.S. PATENT DOCUMENTS

| | | | |
|---|---|---|---|
| 4,813,633 A * | 3/1989 | Werle | B63H 9/0607 244/130 |
| 4,830,315 A | 5/1989 | Presz, Jr. et al. | |
| 5,074,376 A * | 12/1991 | Powell | B63H 1/28 181/277 |
| 7,293,959 B2 | 11/2007 | Pedersen et al. | |
| 7,914,259 B2 | 3/2011 | Godsk | |
| 8,573,541 B2 | 11/2013 | Sullivan et al. | |
| 2003/0099546 A1 | 5/2003 | Stiesdal et al. | |
| 2007/0036653 A1 | 2/2007 | Bak et al. | |
| 2009/0074574 A1 | 3/2009 | Godsk et al. | |
| 2009/0074585 A1 | 3/2009 | Koegler et al. | |
| 2011/0142665 A1* | 6/2011 | Huck | F03D 1/0633 416/228 |

(Continued)

FOREIGN PATENT DOCUMENTS

| DE | 102006043462 A1 | 3/2008 |
|---|---|---|
| JP | 2003254225 A | 9/2003 |
| WO | 9205341 A1 | 4/1992 |

OTHER PUBLICATIONS

DE 102006043462 A1. Translation. Mar. 27, 2008.*

(Continued)

*Primary Examiner* — R. K. Arundale

(57) ABSTRACT

A wind turbine blade airfoil trailing edge (TE) with a first waveform profile (44B, 44C, 44E) as seen from behind, formed by ruffles or alternating ridges (21) and valleys (22) formed on the airfoil (20) and ending at the trailing edge. The trailing edge may further include a second waveform profile (48B, 48C, 48E) as seen from above, resulting from serrations formed by an oblique termination plane (32B) of the trailing edge or by other geometry. The ridges and/or serrations may be asymmetric (44E, 48E) to increase a stall fence effect of the ridges on the suction side (SS) of the trailing edge. The first and second waveforms may have the same period (44B, 48B) or different periods (44C, 48C).

7 Claims, 4 Drawing Sheets

(56) References Cited

U.S. PATENT DOCUMENTS

| | | |
|---|---|---|
| 2011/0142673 A1 | 6/2011 | Fang et al. |
| 2012/0061522 A1 | 3/2012 | Sullivan |
| 2013/0149162 A1 | 6/2013 | Smith et al. |

OTHER PUBLICATIONS

Matthew F. Barone, "Survey of Techniques for Reduction of Wind Turbine Blade Trailing Edge Noise", Aug. 2011, all pages, Sandia National Laboratories, U.S.

* cited by examiner

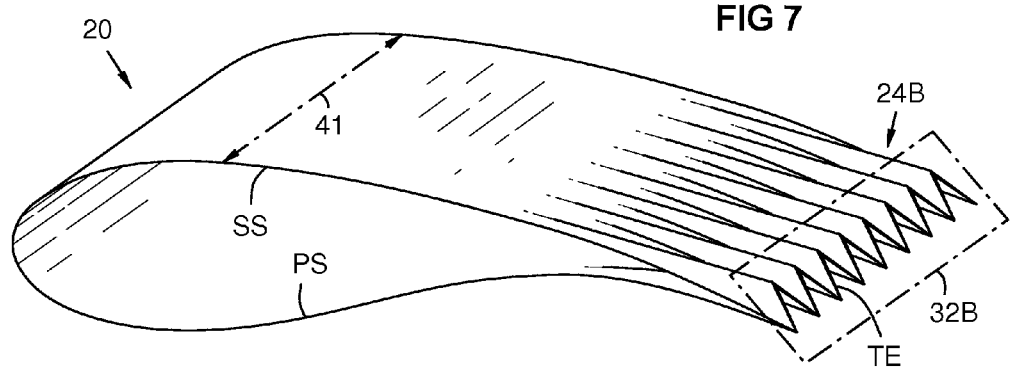
FIG 7
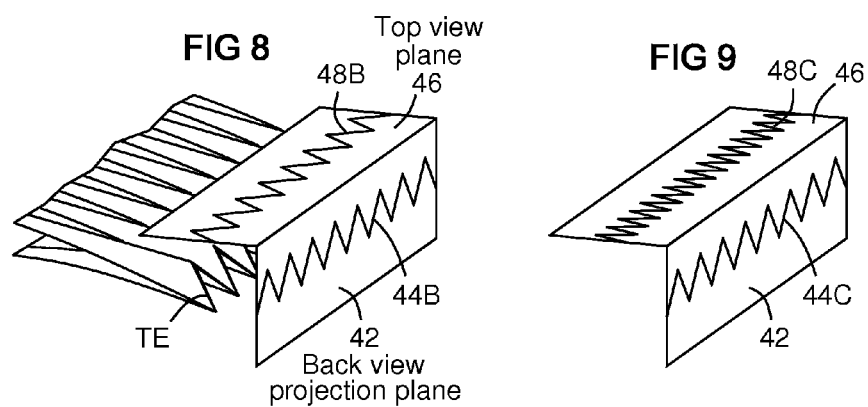
FIG 8
FIG 9
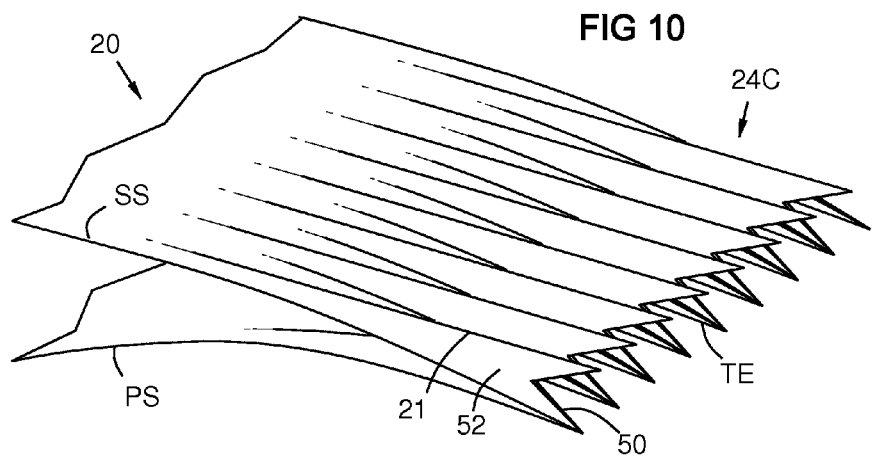
FIG 10

FIG 11
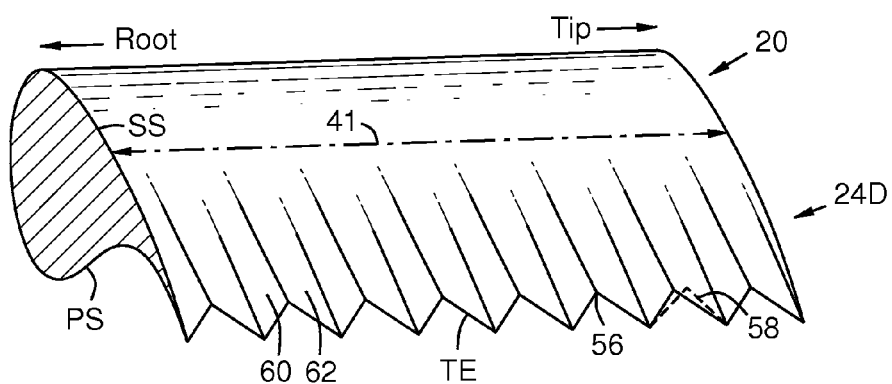
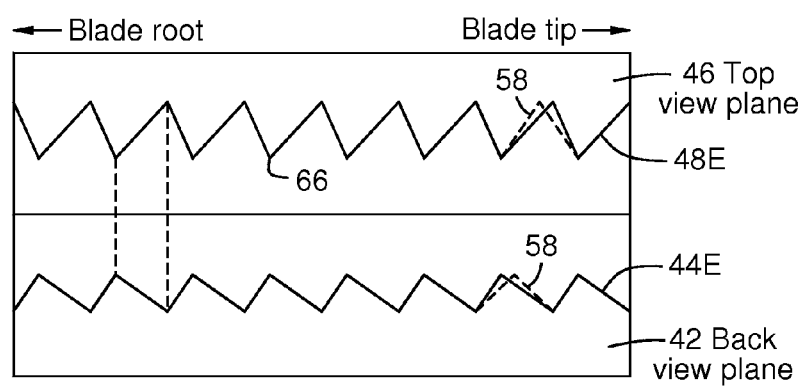
FIG 12

TRAILING EDGE MODIFICATIONS FOR WIND TURBINE AIRFOIL

FIELD OF THE INVENTION

The invention relates generally to wind turbine blade design, and more particularly to trailing edge modifications for noise reduction.

BACKGROUND OF THE INVENTION

Noise considerations can limit the efficiency and maximum size of wind turbines; in part because the blade tip speed must be limited to reduce noise, thus reducing the potential for energy production A major component of wind turbine noise is trailing edge aerodynamic noise (Matthew F. Barone, "Survey of Techniques for Reduction of Wind Turbine Blade Trailing Edge Noise", Sandia National Laboratories, SAND20011-5252, August 2011, page 8). Trailing edge noise can be reduced to some extent by trailing edge serrations or saw teeth 19 as illustrated in FIG. 1 herein. However, serrations are not effective under all conditions (Barone supra, page 20).

BRIEF DESCRIPTION OF THE DRAWINGS

The invention is explained in the following description in view of the drawings that show:

FIG. 7 is a perspective view of an airfoil with trailing edge ruffles with an oblique trailing edge plane resulting in serrations as seen from above FIG. 8 shows two projection planes representing back and top views of the trailing edge of FIG. 7.

FIG. 9 shows two projection planes representing back and top views of the trailing edge of FIG. 10.

FIG. 10 is a perspective view of trailing portion of an airfoil with trailing edge serrations having half the period of the ruffles.

FIG. 11 is a perspective view of a surface of an airfoil with suction side peaks leaning toward the blade root.

FIG. 12 shows back and top view projections of an embodiment with asymmetric waveform profiles of a trailing edge with serrations.

DETAILED DESCRIPTION OF THE INVENTION

Figure 1:
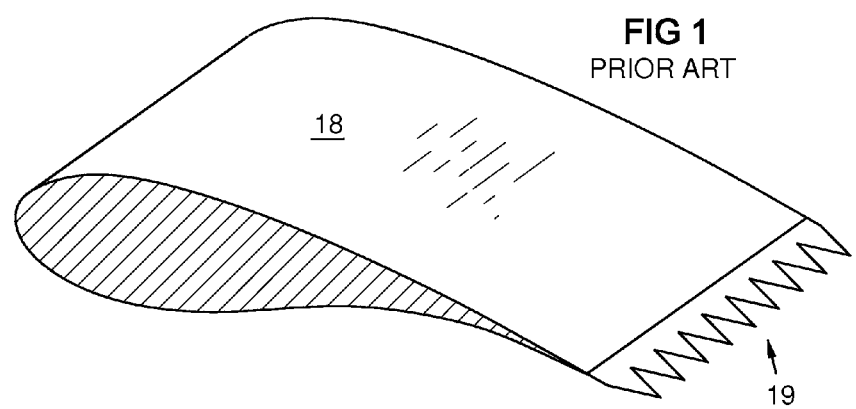
FIG. 1 is a perspective view of a prior art wind turbine airfoil with an add-on serrated trailing edge.

FIG. 1 is a perspective view of a prior art wind turbine blade airfoil 18 with a serrated 19 or saw tooth trailing edge. This device reduces trailing edge turbulence noise to some extent in some conditions, but not in others. The inventors recognized that alternate devices would be useful for a wider range of conditions. They further recognized that 3-dimensional trailing edge modifications as exemplified herein could provide noise reductions under a wider range of conditions, and in addition, could provide synergistic structural and aerodynamic benefits.

Figure 2:
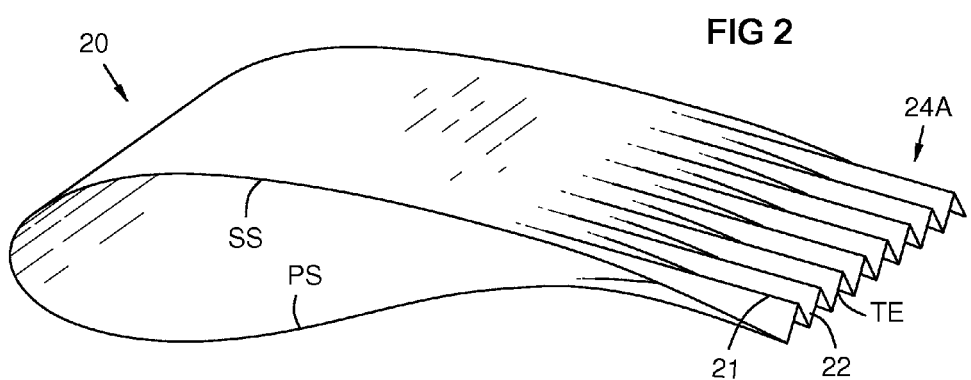
FIG. 2 is a perspective view of a surface of a wind turbine airfoil with a ruffled trailing edge according to aspects of an embodiment of the invention

FIG. 2 shows the surface geometry of a wind turbine airfoil 20 with aspects of an embodiment of the invention. A trailing portion of the blade has ruffles 24A or alternating ridges 21 and valleys 22 with a trailing edge TE that follows a zigzag or waveform path when viewed from behind. Herein "ruffles" means alternating ridges and valleys on both the suction side and pressure side surfaces Valleys on the pressure side may oppose the ridges on the suction side and nest with them at the trailing edge, forming a waveform trailing edge profile as seen from behind the airfoil. The ridges and valleys may merge smoothly between the waveform trailing edge and the suction and pressure surfaces as shown, so that the ridges and valleys are eliminated over at least a forward half of the airfoil. Alternately the ruffles may be added to the airfoil as a flap (not shown).

The ruffles smooth the airflow transition from the pressure side PS and suction side SS to the slipstream, reducing the intensity of slipstream mixing turbulence by increasing the effective angles of the trailing edge to the airflow, thus graduating the transition. In addition to noise reduction, this shape increases flexibility of the blade in the chord plane," thus avoiding buckling of the trailing edge. "Chord plane" herein means a plane of a chord line and a line parallel to the span of the blade. Furthermore, the ridges act as a series of stall fences that impede radial propagation of airflow separation when a portion of the blade stalls. Thus the ruffles provide three-way synergy with structural, aerodynamic, and noise aspects. The ruffles may have thin trailing edges TE in some embodiments to avoid Von Karman vortex shedding They may have sharp ridges and valleys as shown or the ridges and valleys may be rounded.

Figure 3:
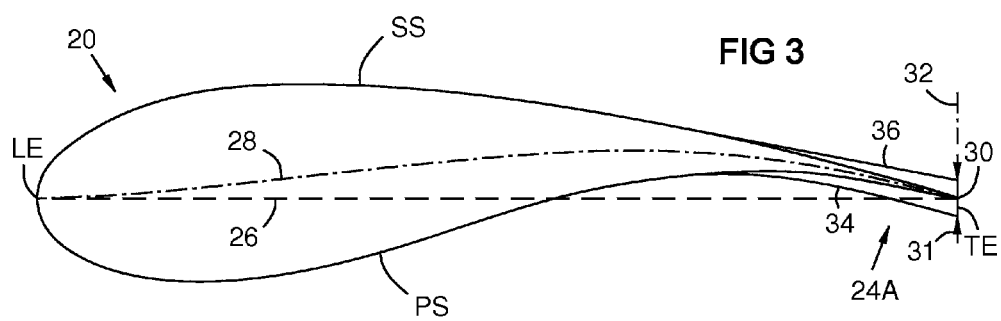
FIG. 3 shows a transverse profile of the airfoil of FIG. 2.

FIG. 3 shows a transverse sectional profile of the airfoil of FIG. 2. The trailing edge TE of the ruffles may follow a plane 32 that is normal to the chord line 26 or normal to the mean camber line 28 as seen the transverse section Where the blade tapers, this plane 32 may be non-parallel to the overall span of the blade, so it is not necessarily normal to a given chord line. However, it is described as perpendicular or oblique to the chord line or mean camber line as seen in a transverse section, in which the plane 32 appears as a line. The ruffles 24A may form departures 34, 36 from the pressure side PS and suction side SS of a nominal unruffled airfoil, and from a nominal mean blade trailing edge 30. The departures may have a peak-to-peak amplitude 31 at the trailing edge of at least 2% of the chord length (3.9% shown), or at least 3% or at least 5% in some embodiments as measured in a direction normal to the chord plane. The amplitude 31 may be relative to the local chord line 28, and thus may vary over a given span of a tapered airfoil. Alternately, a single amplitude 31 may be maintained by a waveform profile of the trailing edge over the given span of the airfoil as seen from behind the airfoil, where this single amplitude has at least one of the minimum magnitudes listed above relative to a mean chord length over the given span.

Alternately, the ruffles may be provided as an add-on flap (not shown) that extends the trailing edge aft. The flap may be aligned with the chord line 26 or the mean camber line 28 or it may be form an angle or variable angles thereto. It may have departures of at least one of the magnitudes listed above relative to the chord line as extended via the flap.

Figure 4:
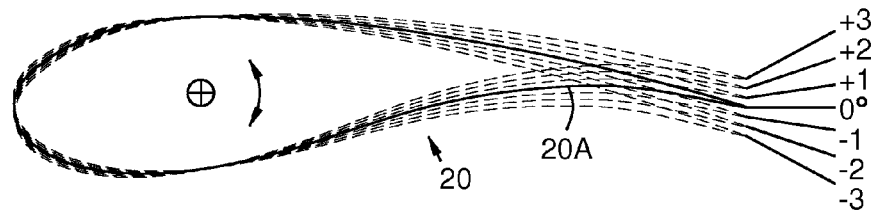
FIG. 4 shows a wind turbine airfoil in multiple positions used to simulate the aerodynamic effects of the ruffles of FIG. 2.

FIG. 4 shows an airfoil 20 in multiple positions used to simulate the aerodynamic effects of the ruffles of FIG. 2. The airfoil is analyzed in a first or neutral position 20A (solid line) at 0 degrees and in alternate angle of attack positions (dashed lines). Lift and drag coefficient curves are averaged over all of the airfoil positions, and the averaged curves are compared to the curve for the neutral position 20A in the subsequent graphs. Aerodynamic effects of the ruffled trailing edge can be approximated by such averaging of small changes in angle of attack (shown here) or small changes in camber (not shown).

Figure 5:
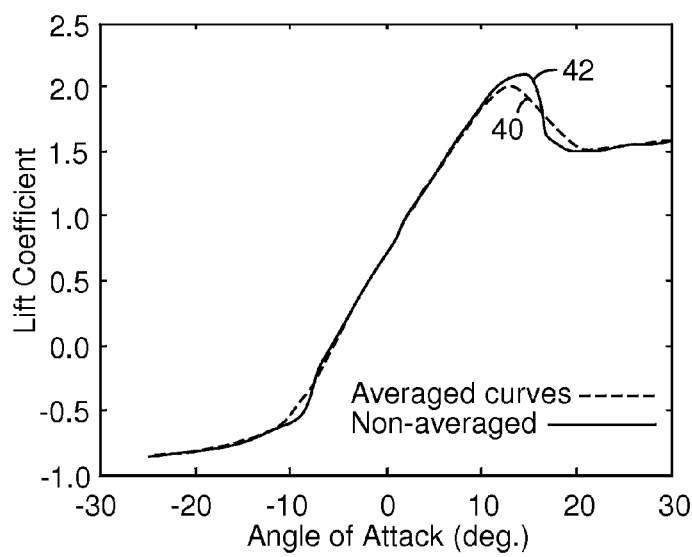
FIG. 5 shows the aerodynamic smoothing effect of averaging the lift coefficients of all airfoil positions of FIG. 4.

FIG. 5 shows the aerodynamic smoothing effect 40 of averaging the lift coefficients of all airfoil positions of FIG. 4. It shows a small drop in maximum lift and a smoothing and broadening of the maximum lift region, plus smoothing near the bottom of the curve compared to the non-averaged curve 42 for the neutral airfoil 20A.

Figure 6:
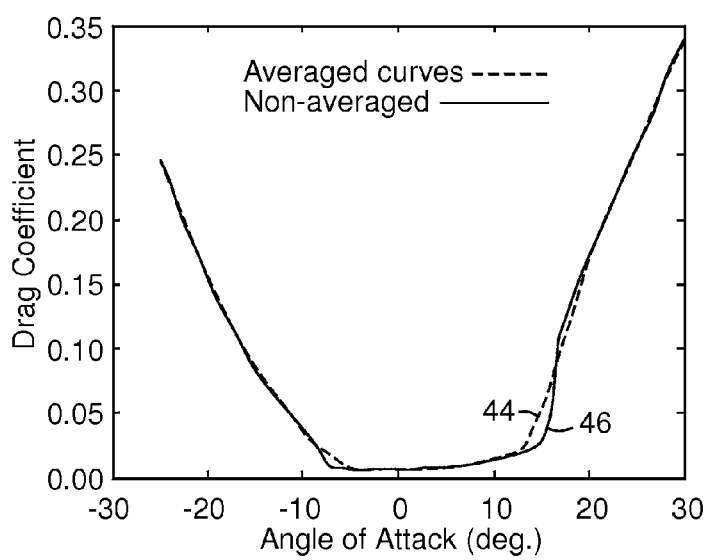
FIG. 6 shows the aerodynamic smoothing effect of averaging the drag coefficients of all airfoil positions of FIG. 4.

FIG. 6 shows the aerodynamic smoothing effect 44 of averaging the drag coefficients of all airfoil positions of FIG. 4 compared to the non-averaged curve 46 for the neutral profile 20A The smoothing effects of FIGS. 5 and 6 reduce fatigue loads on the blade, since random perturbations to the local angle of attack of a blade section produce smaller variations in loads. Undesirable load variations occur during sharp changes in aerodynamic forces This benefit has synergy with both noise reduction and aerodynamic efficiency since sharp differences in adjacent aerodynamics induce turbulence, and thus increase noise and drag.

FIG. 7 shows an embodiment of trailing edge ruffles 24B with oblique trailing edges TE. The trailing edges may follow a plane 32B that is oblique to the chord line or mean camber line as seen in a transverse section of the blade (FIG. 3). This oblique plane results in serrations as seen from above, providing a doubly graduated transition of airflow from the pressure and suction sides PS, SS to the slipstream The plane 32B may lean toward the suction side as shown by any angle or at least 45 degrees relative to a plane normal to the chord line or mean camber line as seen in the transverse section. Alternately it may lean at any angle or at least 45 degrees away from the suction side (not shown) for similar results. A spanwise direction 41 of the blade is indicated.

FIG. 8 shows a projection plane 42 normal to the cord line and parallel to the span of the blade. It shows the projection 44B of the trailing edge TE of FIG. 7 as seen from behind the airfoil 20. This projection may form a triangular wave. Alternately, the ridges may be rounded, making this projection a rounded or smooth wave, including a sinusoidal wave. Other forms such as trapezoidal waves are possible. A second projection plane 46 is shown parallel to the chord and parallel to the span of the blade. It shows the projection 48B of the trailing edge TE of FIG. 7 as seen from above the trailing edge. Peak-to-peak amplitudes in each of the respective waveform projections 44B, 48B may be at least 2% of the airfoil chord length or at least 3% or at least 5% in some embodiments as previously described.

FIG. 9 shows trailing edge back view and top view projections of the embodiment 24C of FIG. 10. In this embodiment the serrations 48C have ½ the wave period of the ruffles 44C, and in other embodiments the serrations 48C may have no more than ½ the wave period of the ruffles 44C.

FIG. 10 is a perspective view of an embodiment trailing edge ruffles 24C with serrations having ½ the period of the ruffles. This ratio provides a serration 50 on the trailing edge of each side surface 52 of each ridge 21, providing more angular transitions of the pressure and suction side airstreams as they merge into the slipstream. The serrations 50 may be V-shaped as shown or they may be rounded. Back view 44C and top view 48C projections of this trailing edge are shown in FIG. 9. Other serration/ruffle period ratios may be used, for example ¼, to provide varying trailing edge geometry that avoids constructive interference and resonance in the slipstream. The phase between these two functions may be selected as part of the airfoil design to produce various shapes and effects as desired for respective applications FIG. 11 is a perspective view of an embodiment of trailing edge ruffles 24D with asymmetric suction side peaks 56 that are angled or disposed toward the blade root. This asymmetry increases the effectiveness of the ridges as stall fences that impede the radially outward pumping of separated airflow from a stalled region of the airfoil during operation of the airfoil in a wind turbine machine. Each ridge may have a relatively narrower suction side surface 60 facing toward the blade root and a relatively wider suction side surface 62 facing toward the blade tip. This results in a trailing edge projected as an asymmetric triangular wave as seen from behind the airfoil.

FIG. 12 shows a back view projection plane 42 and a top view projection plane 46 with both planes in the plane of the page. This shows an embodiment with asymmetric ridges as in FIG. 11 resulting in the asymmetric triangular wave projection 44E. In addition, asymmetric serrations 48E are provided as seen in the top view, with aft pointing peaks 66 that lean toward the blade root. The vertical dashed lines show the serration peaks 66 may coincide with the ridge peaks 56, and the serration valleys may coincide with the ridge valleys. Such serrations may be formed by an oblique trailing edge plane as shown in FIG. 7. This embodiment provides four-way synergy—structural enhancement, turbulence drag reduction, noise reduction, and increased stall fence effectiveness. Alternate profiles 58 show a corresponding symmetric ridge for comparison While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A wind turbine airfoil comprising:
   a trailing edge comprising serrations as viewed from above the airfoil; and
   ridges on a suction side and opposed valleys on a pressure side of the airfoil forming a waveform profile of the trailing edge as viewed from behind the airfoil,
   wherein waveform profile of the trailing edge as viewed from behind the airfoil comprises a series of triangles with suction side peaks leaning toward a root end of the airfoil.

2. The wind turbine airfoil of claim 1, wherein the serrations comprise a triangular waveform as viewed from above the airfoil.

3. The wind turbine airfoil of claim 1, wherein the trailing edge follows a plane that is at least 45 degrees from normal to a chord line or a mean camber line of the airfoil as seen in a transverse section of the airfoil.

4. The wind turbine airfoil of claim 1, wherein the trailing edge follows a plane that leans toward the suction side.

5. The wind turbine airfoil of claim 1, wherein the waveform profile of the trailing edge comprises a peak-to-peak amplitude of at least 2% of a chord length of the airfoil as seen from behind the airfoil.

6. The wind turbine airfoil of claim 1, wherein the ridges merge smoothly forward from the trailing edge into the suction side of the airfoil, and wherein the ridges and valleys are absent over at least a forward half of the airfoil.

7. The wind turbine airfoil of claim 1, wherein the trailing edge follows a plane that leans toward the pressure side.

\* \* \* \* \*